United States Patent
Thangamuthu et al.

(10) Patent No.: US 10,413,872 B2
(45) Date of Patent: Sep. 17, 2019

(54) CARBONATOR

(71) Applicant: Breville Pty Limited, Alexandria, NSW (AU)

(72) Inventors: Sathiaseelan Thangamuthu, Telopea (AU); Simon James Chalk, Redfern (AU); Con Psarologos, Bardwell Valley (AU); Andrew John Grigor, Kensington (AU); Gerard Andrew White, Darlington (AU); Chiu Keung Kenneth Lee, St Leonards (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 225 days.

(21) Appl. No.: 14/912,090

(22) PCT Filed: Aug. 13, 2014

(86) PCT No.: PCT/AU2014/000804
§ 371 (c)(1),
(2) Date: Feb. 14, 2016

(87) PCT Pub. No.: WO2015/021498
PCT Pub. Date: Feb. 19, 2015

(65) Prior Publication Data
US 2016/0199795 A1 Jul. 14, 2016

(30) Foreign Application Priority Data
Aug. 13, 2013 (AU) .................................. 2013903050

(51) Int. Cl.
*B01F 3/04* (2006.01)
*B01F 15/00* (2006.01)
(Continued)

(52) U.S. Cl.
CPC ............ *B01F 3/04801* (2013.01); *A23L 2/54* (2013.01); *B01F 3/04794* (2013.01);
(Continued)

(58) Field of Classification Search
CPC .............. B01F 3/04808; B01F 3/04801; B01F 15/00344; B01F 15/00; B01F 3/04794;
(Continued)

(56) References Cited

U.S. PATENT DOCUMENTS 2,552,057 A * 5/1951 Paik .................... B01F 7/00075
366/242
3,416,548 A * 12/1968 Bach ...................... F16K 13/06
137/68.13
(Continued)

FOREIGN PATENT DOCUMENTS

CN 1537028 10/2004
EP 2053014 A1 4/2009
(Continued)

OTHER PUBLICATIONS

"Solenoid valve" Wikipedia published Aug. 3, 2011 accessed at <https://en.wikipedia.org/w/index.php?title=Solenoid_valve&oldid=442890714>.*

(Continued)

*Primary Examiner* — Stephen Hobson
(74) *Attorney, Agent, or Firm* — Marshall, Gerstein & Borun LLP

(57) ABSTRACT

A domestic beverage carbonator for carbonating a liquid in a bottle comprising temperature and pressure sensors that communicate with a processor to improve the carbonation process. The device further comprises a CO2 cylinder coupling and a cylinder discharge valve, an exhaust valve, a fill head and a user interface. The user interface further comprises user controls and a graphic display and the fill head (Continued)

has a pressure sensor to sense a pressure in the attached bottle and communicate a pressure signal to the processor and the processor uses the pressure signal to regulate the cylinder valve and the exhaust valve.

11 Claims, 17 Drawing Sheets

(51) Int. Cl.
  *A23L 2/54* (2006.01)
  *B67D 1/00* (2006.01)
(52) U.S. Cl.
  CPC .... *B01F 3/04815* (2013.01); *B01F 15/00162* (2013.01); *B01F 15/00175* (2013.01); *B01F 15/00344* (2013.01); *B67D 1/0072* (2013.01)
(58) Field of Classification Search
  CPC .......... B01F 15/00175; B01F 3/04815; B67D 1/0072; A23L 2/54
  See application file for complete search history.

(56) References Cited

U.S. PATENT DOCUMENTS

| | | | | | |
|---|---|---|---|---|---|
| 3,556,356 | A * | 1/1971 | Mockesch | ........... | B67D 1/0412 222/1 |
| 4,120,425 | A * | 10/1978 | Bethurum | ............. | B67D 1/045 222/146.6 |
| 4,518,541 | A * | 5/1985 | Harris | ....................... | A23L 2/54 261/27 |
| 4,745,794 | A * | 5/1988 | Steichen | ................... | G01N 7/14 73/19.03 |
| 4,804,112 | A * | 2/1989 | Jeans | .................... | B67D 1/0057 222/129.1 |
| 5,033,645 | A * | 7/1991 | Shannon | ............... | B67D 1/0009 222/129.1 |
| 5,115,942 | A * | 5/1992 | Merrill | ................. | B67D 1/0857 222/1 |
| 5,160,461 | A * | 11/1992 | Burrows | ............. | B01F 3/04531 261/140.1 |
| 5,318,197 | A * | 6/1994 | Martindale | .......... | B67D 1/1234 222/1 |
| 5,426,593 | A * | 6/1995 | Seiden | ................... | G01N 27/49 702/24 |
| 5,499,741 | A * | 3/1996 | Scott | .................... | B67D 1/0039 222/129.4 |
| 5,565,149 | A * | 10/1996 | Page | .................. | B01D 19/0031 210/321.8 |
| 5,657,960 | A * | 8/1997 | Taylor | ..................... | F16K 7/061 251/4 |
| 6,138,995 | A * | 10/2000 | Page | .................... | B67D 1/0077 210/321.8 |
| 6,182,949 | B1 * | 2/2001 | Mobbs | ................ | B01F 3/04531 261/119.1 |
| 6,843,098 | B2 * | 1/2005 | Brazier | .................. | F16K 17/16 137/557 |
| 7,258,127 | B1 * | 8/2007 | Schneider | ............... | F17C 13/04 137/109 |
| 7,537,019 | B2 * | 5/2009 | Ting | ...................... | A23L 3/0155 137/14 |
| 7,597,124 | B2 * | 10/2009 | Litto | .................... | B67D 1/0878 141/114 |
| 8,215,331 | B2 * | 7/2012 | Chen | ........................ | F17D 5/02 137/115.13 |
| 8,727,323 | B2 * | 5/2014 | Seiwart | ................... | C02F 1/685 261/26 |
| 9,376,989 | B2 * | 6/2016 | Peters | ..................... | F02M 25/08 |
| 2002/0088823 | A1 * | 7/2002 | Tabacchi | ............. | B67D 1/1206 222/52 |
| 2003/0075813 | A1 * | 4/2003 | Kiefer | ................. | B01F 13/0033 261/64.3 |
| 2004/0124548 | A1 * | 7/2004 | Rona | ................... | B01F 3/04531 261/64.3 |
| 2006/0060606 | A1 * | 3/2006 | Jablonski | ............. | B67D 1/0057 222/129.1 |
| 2010/0028468 | A1 * | 2/2010 | Pacioretty | ............ | A61K 31/195 424/732 |
| 2010/0236320 | A1 * | 9/2010 | Stehle | .................... | G01N 33/14 73/19.1 |
| 2010/0251901 | A1 * | 10/2010 | Santoiemmo | ............. | A23L 2/52 99/323.2 |
| 2011/0020508 | A1 * | 1/2011 | Santoiemmo | ............. | A23L 2/54 426/232 |
| 2011/0168736 | A1 * | 7/2011 | Finlay | .................. | B67D 1/0456 222/1 |
| 2011/0220209 | A1 * | 9/2011 | Schori | ................. | B01F 3/04794 137/2 |
| 2012/0107463 | A1 * | 5/2012 | Santoiemmo | ............. | A23L 2/54 426/232 |
| 2013/0026665 | A1 * | 1/2013 | Buosi | .................. | B01F 3/04808 261/64.3 |
| 2013/0233180 | A1 * | 9/2013 | Belmont | ............... | A47J 31/407 99/323.2 |
| 2014/0048144 | A1 * | 2/2014 | Jaeger | .................. | B67D 1/0418 137/14 |
| 2014/0079857 | A1 * | 3/2014 | Pellaud | ................... | C12C 5/026 426/487 |
| 2014/0165845 | A1 * | 6/2014 | Issar | ....................... | A47J 31/20 99/283 |
| 2014/0262899 | A1 * | 9/2014 | Mociak | .............. | B65D 41/0442 206/459.1 |
| 2014/0356491 | A1 * | 12/2014 | Giardino | .................... | A23L 2/54 426/231 |
| 2014/0363548 | A1 * | 12/2014 | Njaastad | ............. | A23L 2/54 426/231 |

FOREIGN PATENT DOCUMENTS

| | | |
|---|---|---|
| GB | 2077126 A | 12/1981 |
| WO | WO 01/03817 A1 * | 1/2001 |
| WO | WO-01/03817 A1 | 1/2001 |
| WO | WO-02/057003 A1 | 7/2002 |
| WO | WO-2012/162762 A1 | 12/2012 |

OTHER PUBLICATIONS

Dangermouse "CO2 low pressure alarm?" published Aug. 5, 2010 accessed at <http://www.plantedtank.net/forums/9-equipment/113331-co2-low-pressure-alarm.html>.*
Office Action in Chinese Patent Application No. 210480056424.8, dated Apr. 20, 2017.
Extended European Search Report for European Patent Application No. 14836943.2, dated Feb. 24, 2017.
International Search Report and Written Opinion for PCT/AU2014/000804, dated Sep. 30, 2014.
International Preliminary Report on Patentability for PCT/AU2014/000804, dated Feb. 16, 2016.

* cited by examiner

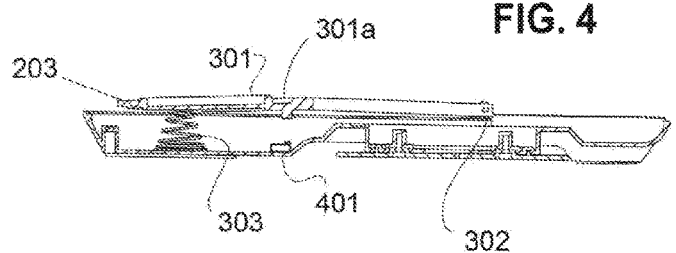
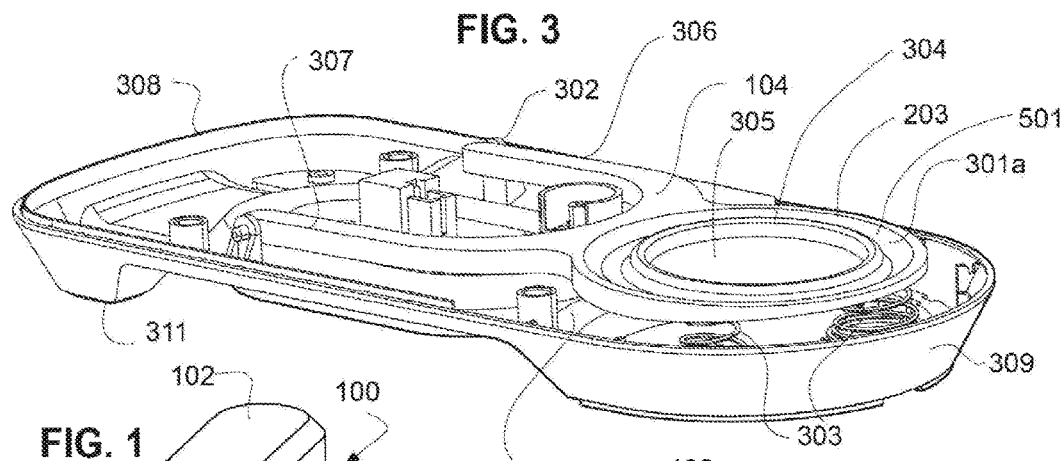
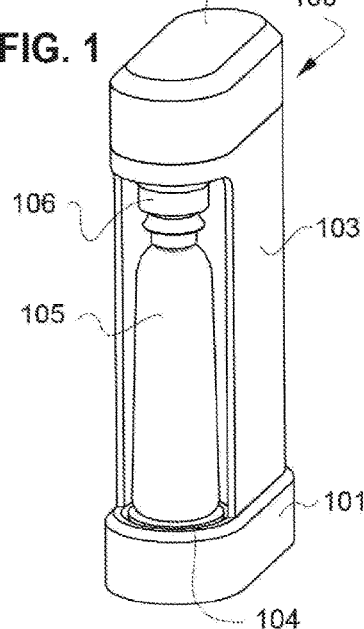
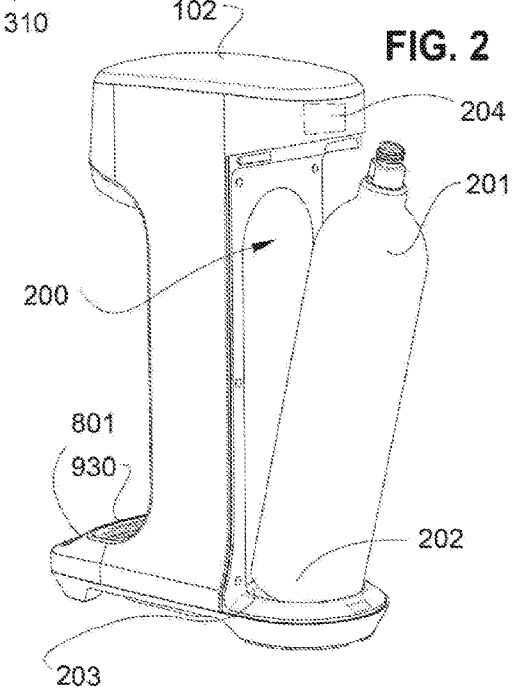

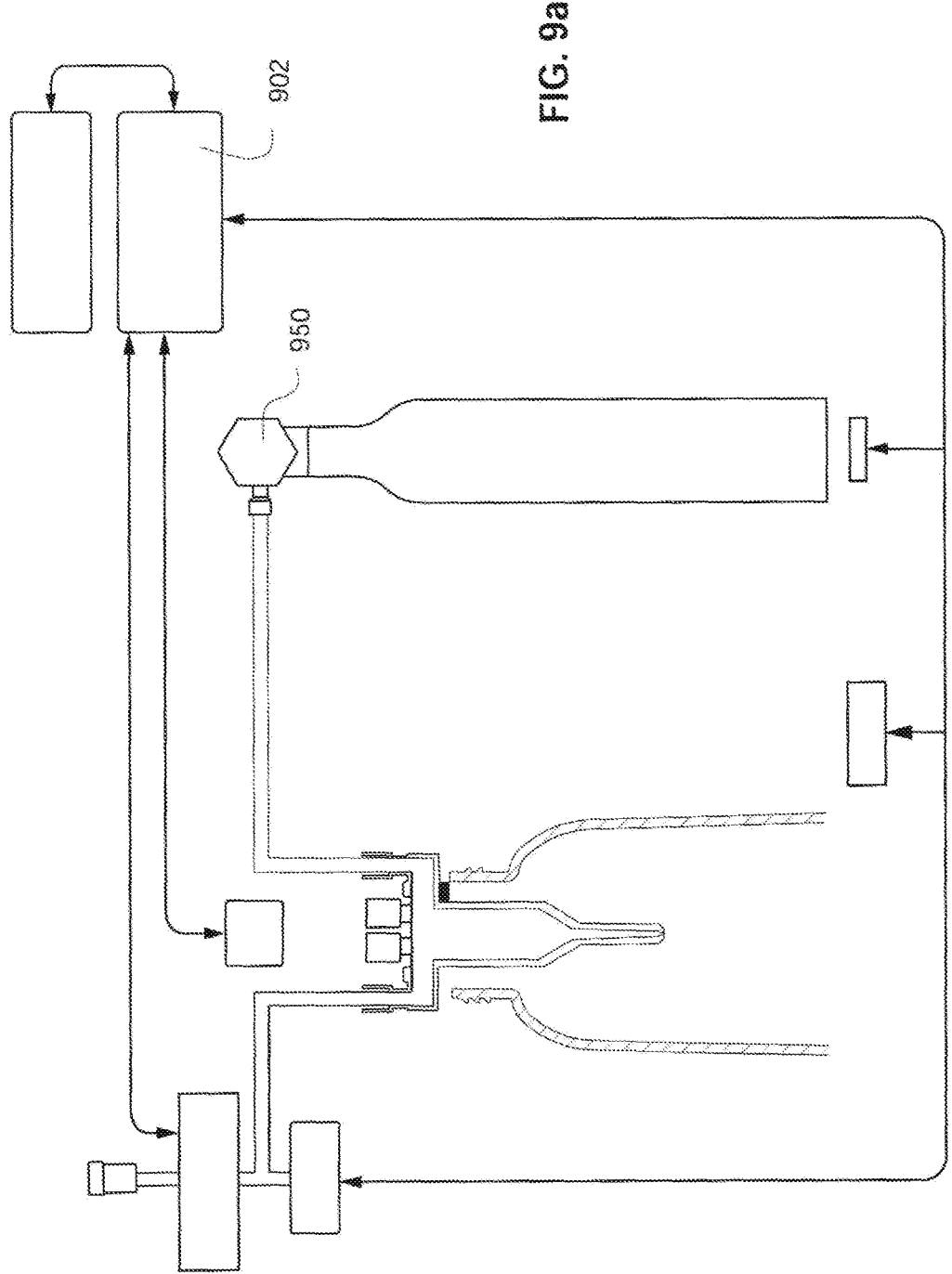

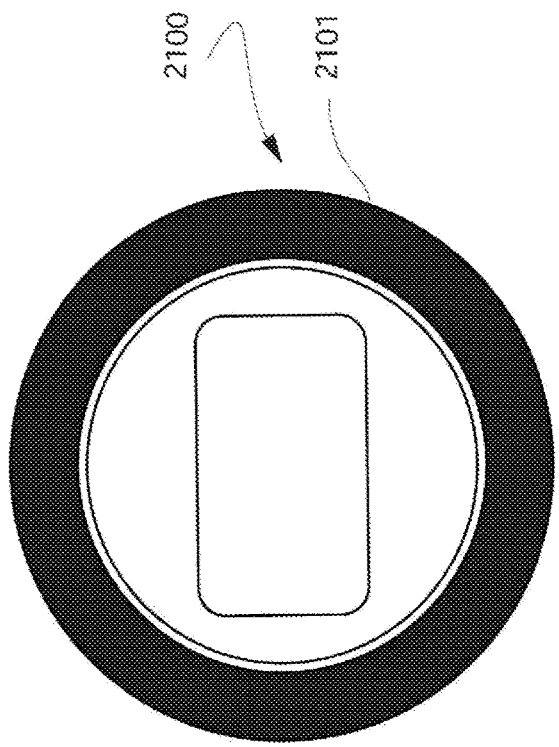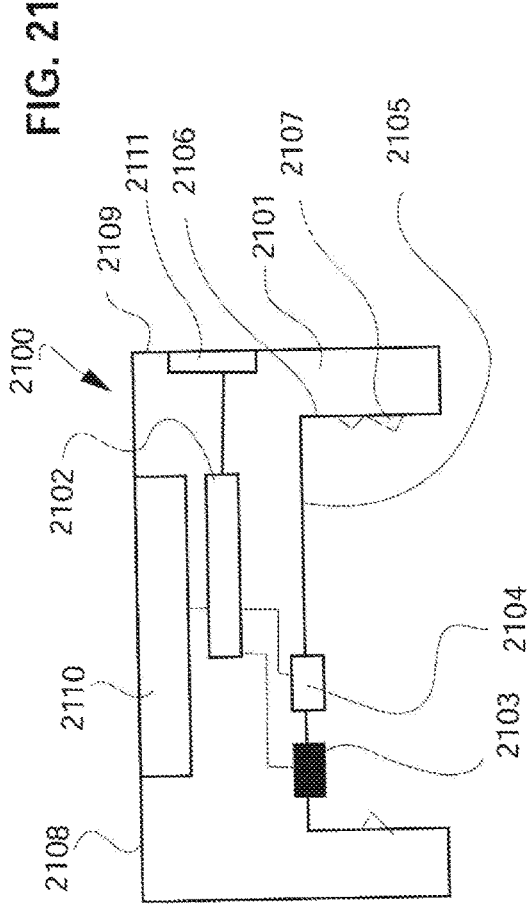
FIG. 21

CARBONATOR

FIELD OF THE INVENTION

The invention relates to domestic carbonation devices and more particularly to a carbonation device that accepts a replaceable bottle for the purpose of carbonating its contents.

BACKGROUND OF THE INVENTION

Domestic carbonators are well known. These devices operate by dispensing or injecting pressurized carbon dioxide into a liquid that is contained in a bottle. The present invention seeks to improve known devices and methods of domestic carbonation by simplifying and automating aspects of the carbonation process, by sensing or obtaining key parameters in the carbonation process and by using information provided by the sensors and other inputs to provide enhanced performance, safety or ease of operation.

The engagement between cylinder of pressurized CO2 and the device that receives it is sometimes unstable or potentially unsafe.

Domestic carbonation devices generally lack the means of sensing the level of water or other liquid in the bottle that is to be carbonated. However, the water level in the bottle has an impact on the performance of the device.

Carbonation devices generally rely on replaceable pressurized cylinders of carbon dioxide. However, as the cylinder is depleted, the cylinder pressure drops. This drop in pressure over successive carbonation cycles can result in inconsistent carbonation results.

Domestic carbonation devices sometimes count the number of carbonation operations for the purpose of providing an indication of the remaining carbon dioxide in a replaceable cylinder. However, failure to reset the counter after a cylinder has been changed, or if the initial cylinder volume is input incorrectly into the device, misleading indications of remaining CO2 volume in the cylinder can cause the consumer to dispose of a cylinder that may actually have useful amounts of carbon dioxide remaining.

The solubility of the carbon dioxide in a liquid is proportional to the time under pressure and inversely proportional to the temperature. A typical domestic carbonation device does not adjust the carbonation time or pressure to compensate for the actual temperature of the liquid being carbonated. Accordingly, inconsistent or sub-optimal carbonation results are sometimes obtained.

Domestic carbonation devices generally lack any form of feedback or direct indication of the amount of carbon dioxide that has been injected into the water or other liquid. Because optimal carbonation requires the appropriate delivery of carbon dioxide injection into the liquid, inconsistent carbonation results are sometimes obtained.

Domestic carbonation devices are somewhat inflexible in the volume of CO2 gas that is delivered for injection into the bottle containing the liquid to be carbonated. In some devices, the smallest volume of gas that the device is able to dispense or deliver is sometimes more than is actually desired or required by the consumer.

When the liquid to be carbonated is flavoured or sweetened, inadvertent discharge of the liquid into the overflow or vent leading from the bottle comprises a contamination that has the potential to become mouldy over time.

The contents of PCT patent application PCT/AU2012/000636 are incorporated herein by referenced.

OBJECTS AND SUMMARY OF THE INVENTION

In some embodiments of the technology, the liquid level in a bottle to be carbonated is determined by measuring the pressure in the bottle during carbonation and obtaining an indication of liquid level based on the time required to reach a particular or target pressure.

In other aspects of the technology, consistent carbonation is achieved by measuring the pressure within a bottle being carbonated while periodically filling and venting. The periodic rise and fall of the pressure in the bottle is used as an indication of when optimum carbonation is obtained.

In some embodiments of the technology, the residual volume of CO2 in a cylinder is determined by measuring the time it takes the pressure in a bottle to be carbonated to reach a target value.

In some embodiments of the technology, a liquid beverage temperature in a bottle to be carbonated is either determined directly or input by a user. The device then adjusts the volume of carbon dioxide delivered to the liquid in accordance with the indicated or determined temperature.

In some embodiments of the technology a separate and single purpose user input is provided that causes the device's microprocessor to activate a pull solenoid or solenoid valve associated with the carbon dioxide cylinder so that a relatively small gas volume is discharged. This relatively small volume corresponds to a volume that is considerably less than the minimum gas discharge volumes associated with typical domestic carbonation devices, or the minimum discharge required to carbonate the smallest bottle that the device is configured to handle.

In some embodiments of the invention, an exhaust path from a bottle being carbonated can be opened. Clean water from a bottle is then forced with carbon dioxide into the exhaust path so that it flows into the open exhaust line. This has the effect of purging or cleaning the exhaust line of unwanted residue.

BRIEF DESCRIPTION OF THE DRAWING FIGURES

In order that the invention be better understood, reference is now made to the following drawing figures in which:

FIG. 1 is a perspective view of a domestic beverage carbonator.

FIG. 2 is a rear perspective view of the carbonator shown in FIG. 1.

FIG. 3 is a perspective view of the base of a carbonator.

FIG. 4 is a cross sectional view of the base depicted in FIG. 3.

FIGS. 9 and 9(a) are schematic diagrams of a beverage carbonator.

FIGS. 18(a) and (b) are perspective and cross sectional views of a baffle apparatus.

Figure 19:
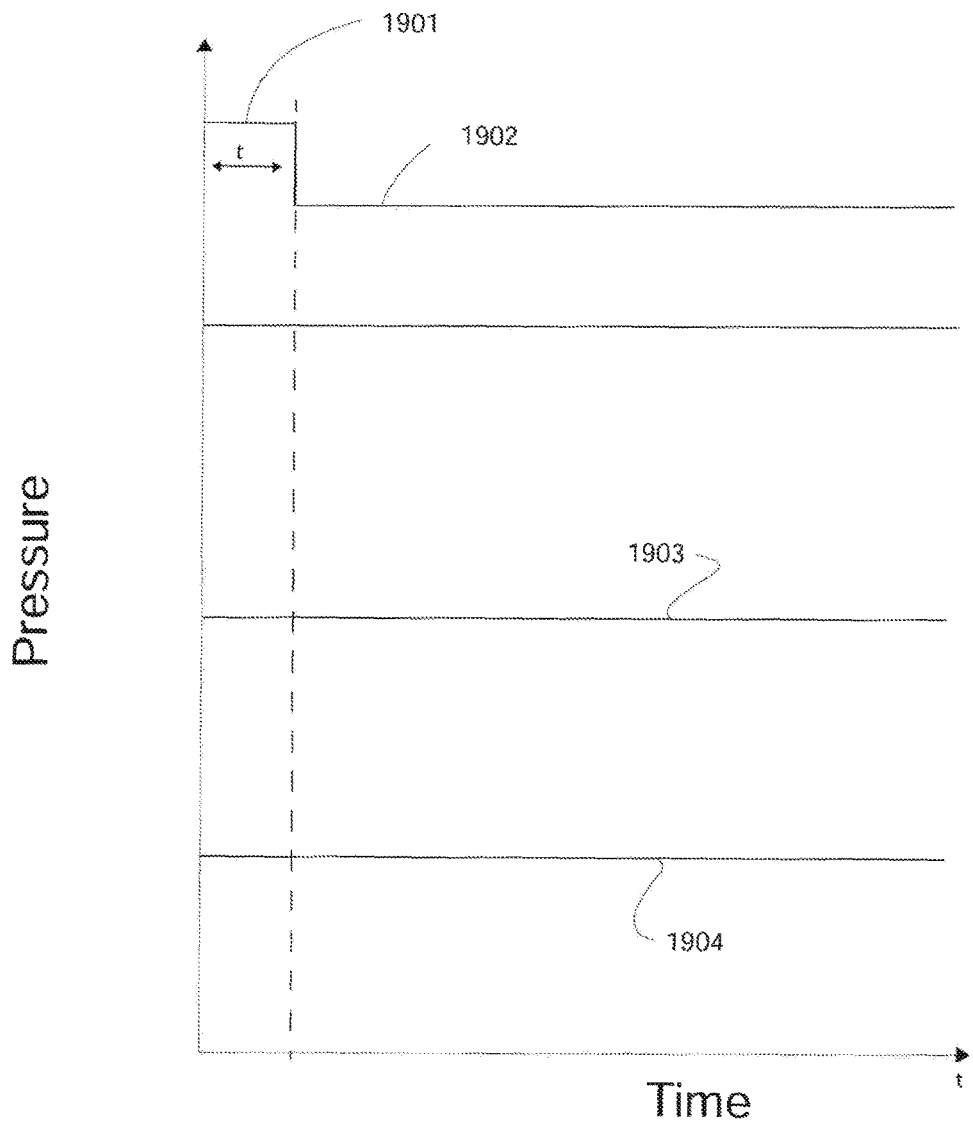

FIG. 19 is a graph illustrating pressure thresholds used to determine bottle fill level.

Figure 20:
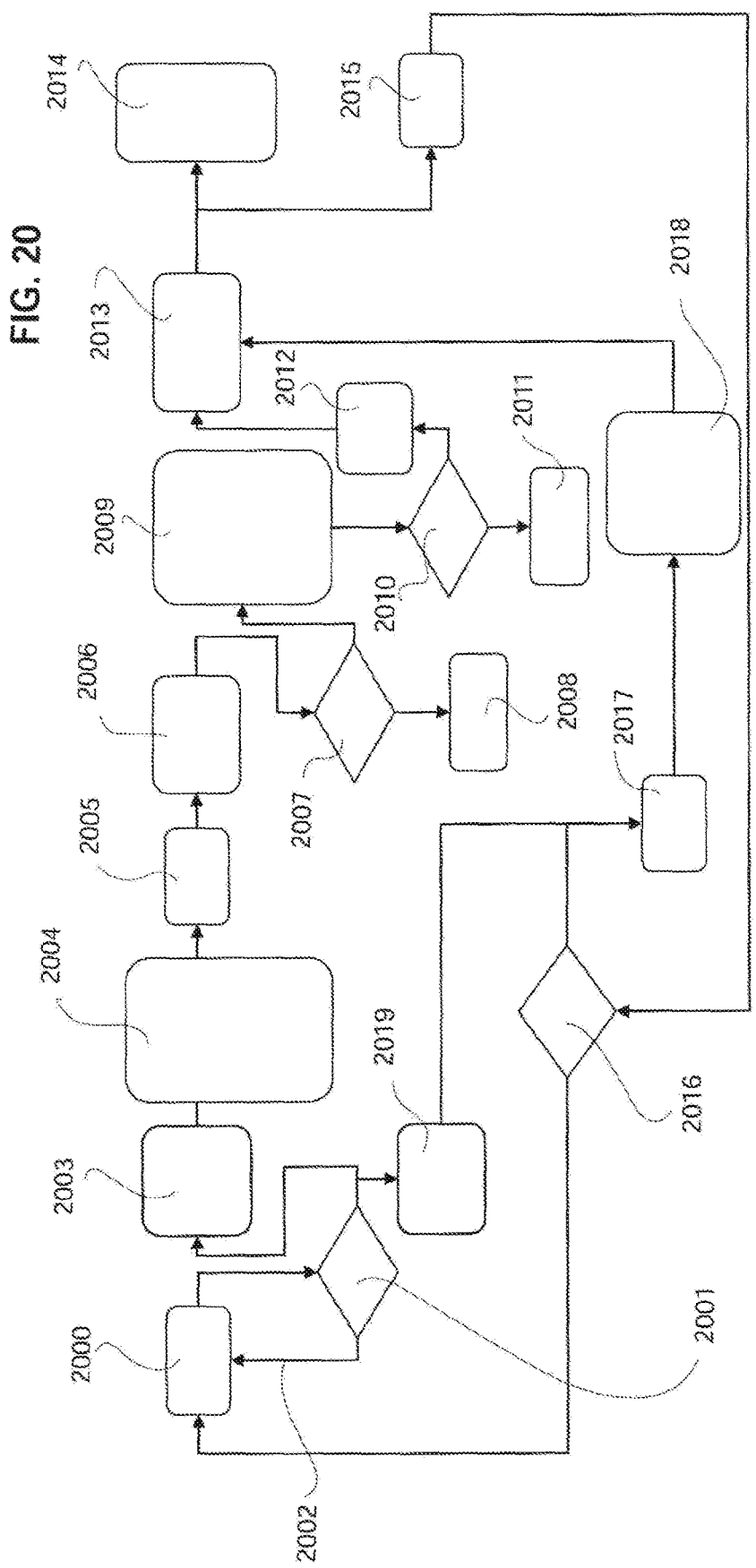

FIG. 20 is a flow chart illustrating the operation of a domestic carbonator.

FIG. 21 illustrates a pressure and temperature indicating bottle cap end top and cross sectional views.

BEST MODE AND OTHER EMBODIMENTS

As shown in FIG. 1, a carbonation device too comprises a base 101 and a compartment 102 that are interconnected by a body 103. The base 101 contains a plinth and drip tray 104 for supporting a bottle to be carbonated 105. The bottle makes a sealing engagement with a fill head 106.

As shown in FIG. 2, a rear of the body 103 has a recess 200 that partially can form the shape of a cylinder for receiving a carbon dioxide gas cylinder 201. The cylinder is inserted by introducing the bottom 202 of the cylinder 201 into the recess area 200. A reciprocating bottle support 203 is located at the lower extent of the recess 200. Owing to the bias of the reciprocating support 203 the cylinder 200 is urged into engagement with a cylinder coupling 204 located adjacent to an upper extent of the recess 200 and preferably within the fill head compartment 102. The bias assists the user by urging the bottle upward as it is being manually threaded into engagement.

As shown in FIGS. 3 and 4, the reciprocating bottle support, in this example, includes at one end of a cylinder engaging portion 301 and remotely from it, or at an opposite end, One or more pivot points 302. The support 203 is restrained by the pivot points 302 and rotates about them. In this example, each of the cylinder supports' pivot points 302 is supported by a leg 306. In this example, the support has two parallel legs 306, 307 that are each joined to the cylinder engaging portion 301. The space between the parallel legs 306, 307 creates a clearance for other parts of the device. The cylinder support 203, its pivot points 302 and the springs 303 are contained within a base portion 308 having a side wall 309 surrounding a bottom surface 310 under which are located supporting feet 311 for stabilising the device. The end of the support having the cylinder engaging portion 203 is urged upwardly by one or more coil springs 303. The cylinder engaging portion 301 comprises a circular well 301a, and upstanding and a circular rim 304 within it. The area within the upstanding lip 304 comprises a circular well or depression 305.

A sensor or contact switch in the base 401 communicates the presence of the bottle 201 to the processor 902.

Figure 5:
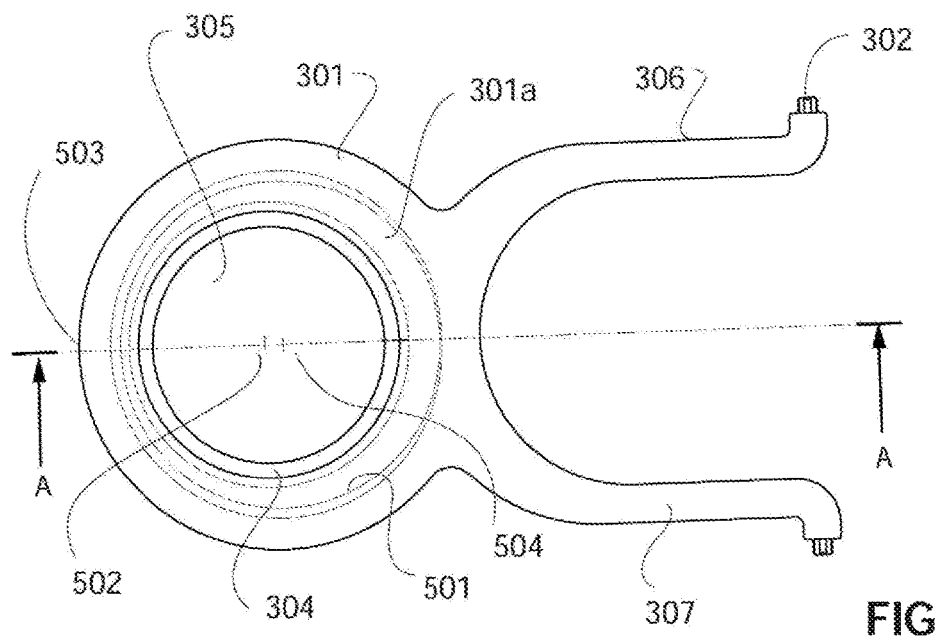
FIG. 5 is a top plan view of a CO2 cylinder support.

As shown in FIG. 5 the circular and upstanding lip 304 may be eccentric to the outer side wall 501 of the toroidal well 303. This eccentricity is caused by moving the centre of the circular lip 502 closer to the front of the cylinder supporting portion 503 than the centre 504 of the toroidal well 504.

Figure 6:
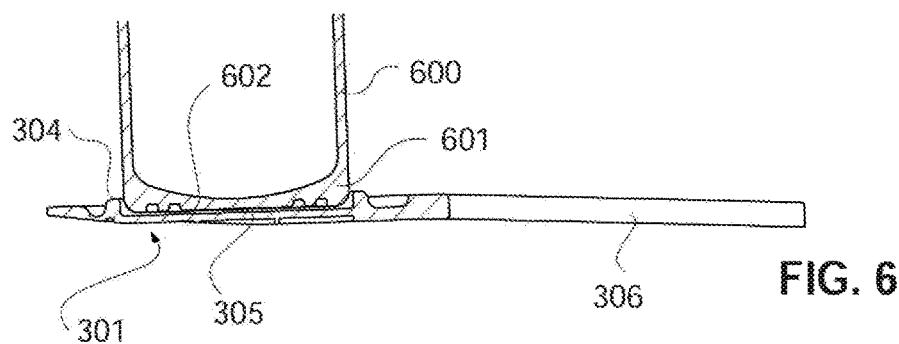
FIG. 6 is a cross sectional view of the device depicted in FIG. 5.
Figure 7:
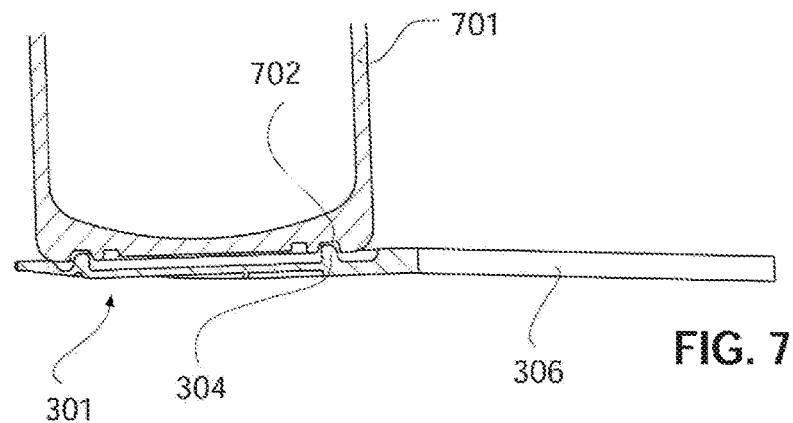
FIG. 7 is a cross sectional view of the device depicted in FIG. 5.

As shown in FIGS. 6 and 7, a cylinder supporting portion 301 in accordance with FIGS. 3 and 5 can accept cylinders of different diameters.

As shown in FIG. 6, the base 601 of a smaller cylinder 600 can be accommodated fully within the upstanding lip 304 so that the underside 602 of the cylinder 600 comes to rest on the upper surface of the central well 305.

As shown in FIG. 7, a larger CO2 cylinder 701 has an under surface featuring one or more circular recesses 702. In this example, the outermost two concentric circular recesses 702 receives the upstanding rim 304.

Figure 8:
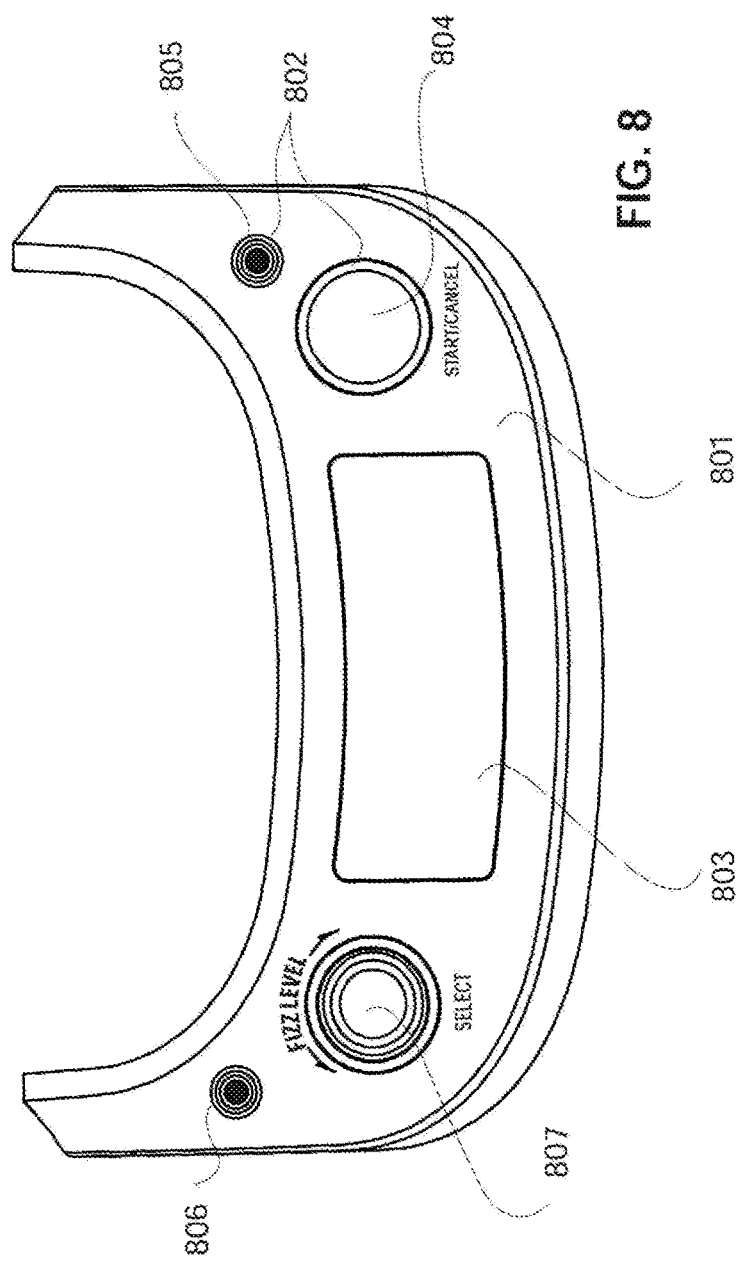
FIG. 8 is a top plan view of a user interface of a beverage carbonator.

As suggested by FIGS. 2 and 8, a forward surface of a carbonation device 801 may be provided with a user interface comprising various user operated controls 802 and a graphic display 803 such as an LCD display or other means of electronic display such as LED indicators. In this example, push button type input controls with illuminated surrounding rings are used to start and stop the device 804, to optionally toggle between chilled water and room temperature water 805 and optionally to request a small volume delivery of gas 806. A rotating knob allows a user to input liquid temperature options or carbonation level 807. The display 803 is used (for example) to indicate user selections, process parameters and the operational state of the device.

A domestic carbonation machine may offer various levels of carbonation to suite a variety of consumer preferences. Conventionally, distinct levels of carbonation are provided in discreet stepwise increments. However, a user desiring only a slight increase in a carbonation level, either before or after carbonation has been completed, is generally left with a single option, that being re-carbonation or extended carbonation based on the lowest delivery volume or time setting available on the machine. However, when a user requires only a slight increase, the lowest carbonation level available from the machine's control panel may be excessive. Accordingly, a selector, control or other user input 806 on the user interface may be used to provide a signal to the microprocessor so as to increase the duration of the gas discharge from the cylinder by an amount that is less than the lowest discharge setting of a convention domestic carbonation machine.

Figure 9:
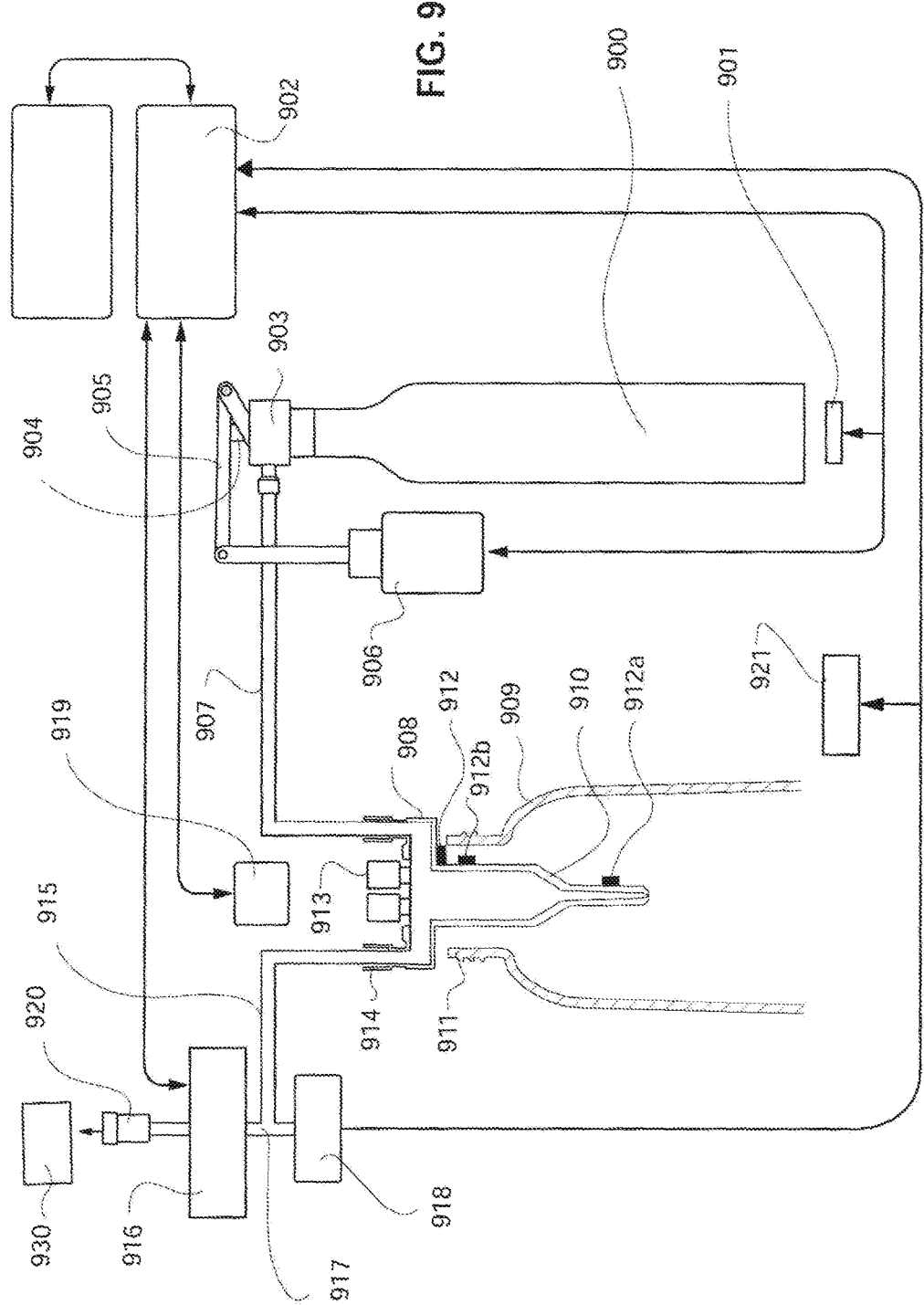

A schematic diagram of an exemplarily device is provided in FIG. 9. In this example, a CO2 cylinder 900 is associated with a sensor 901 that indicates to a microprocessor 902 whether or not the cylinder 900 is in place. The cylinder is attached to an actuator coupling and valve 903 having an actuating stem 904 that is triggered (for example) by a lever 905. One end of the lever is driven by a fill solenoid 906 that is controlled by the microprocessor 902. A gas fill line 907 leads from the actuator valve 903 to the replaceable bottle's fill head 908. The fill head 908 includes means for sealing the fill head against the bottle to be filled 909. The fill head 908 further comprises a gas injection nozzle 910 that is adapted to enter the mouth 911 of the bottle to be fined 909. The fill head may also incorporate one or more sensors 912, 912a, 912b) such as temperature or pressure sensors. The sensor 912a may be located on the nozzle 910. A sensor 912b may be located on the nozzle or fill head above the intended maximum fill level of the bottle 909. The fill head may have an exhaust safety valve 913 for relieving excess pressure. The fill head also has an outlet port 914 that leads to a gas outlet path 915 that terminates in a vent 920. The gas outlet path leads to an exhaust solenoid valve 916 and, by way of a T junction 917 to a pressure transducer 918. The pressure transducer supplies information to the processor 902 relating to the pressure in the bottle. A micro switch 919 adjacent to the fill head, may be used to indicate when the bottle 909 is in correct position for filling and is associated with the microprocessor 902. The exhaust solenoid valve 916 is controlled by the microprocessor 902. The exhaust solenoid valve may be normally open type solenoid valve that controls the discharge from the atmospheric vent 920. The device may incorporate a tilt switch 921 that cooperates with the microprocessor 902, thus allowing the microprocessor 902 to stop the operation of the device and to vent it if the device is not sufficiently upright.

It is advantageous to determine the liquid level in the bottle to be carbonated. With reference to FIG. 9, the sensor 912 is a pressure sensor or transducer. When the liquid level in the bottle 9 is inadequate or in excess, the internal pressure as sensed by the transducer 912 will be excessive when compared by the processor 902 to a stored reference value. When the excess pressure state is detected by the microprocessor 902, it causes the exhaust solenoid to open the outlet path to the atmosphere so as to relieve the internal pressure in the bottle 909. The over pressuring of the bottle 909 by inadequate as space above the liquid is caused when absorption of injected carbon dioxide by the contents of the bottle is inadequate for the purpose of dissolving the dose of carbon dioxide that is provided by the fill head.

Figure 10:
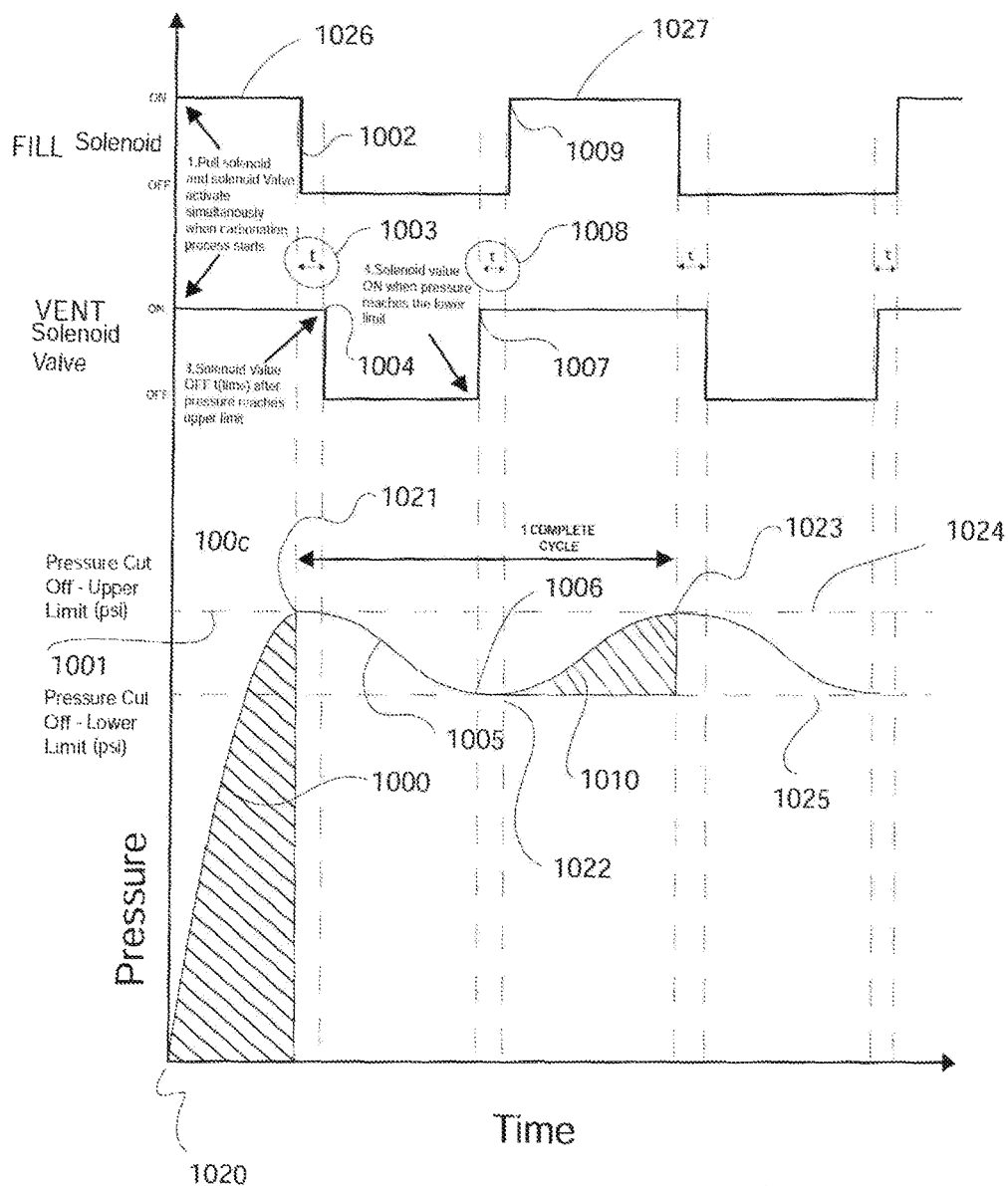
FIG. 10 are graphs illustrating the operation of a carbonator's solenoid valves in relation to the rise and fall of pressure within a beverage bottle whose contents are being carbonated.

The fill head's pressure transducer 912 can also work with the microprocessor 909 for the purpose of achieving consistent carbonation results. With reference to FIGS. 9 and 10 this is done by activating the supply solenoid 906 a first time while the exhaust solenoid 916 is closed. This causes a rise 1000 in the bottle's internal pressure. When the internal pressure reaches a pre-established user selected or other upper limit 1001 the supply solenoid is switched off 1002. After a rest interval 1003, the exhaust solenoid is opened 1004. This causes a decrease 1005 in the bottle's internal pressure when undissolved gas is discharged. When a lower pressure limit 1006 is reached, the exhaust valve is closed 1007. After a second rest interval 1008, the supply solenoid is activated a second time 1009, This causes a second episode of carbonation which in turns results in an increase of the internal pressure 1010 of the bottle 909. This process is repeated thereby causing further carbonation of the contents of the bottle. The more times this cycle is repeated, the closer the actual carbonation is to the desired carbonation limit. This will ensure that the carbonation level is the same, from one bottle filling operation to the next, regardless of the actual volume of $CO_2$ gas contained in the supply cylinder.

As shown in FIG. 9a, the pull solenoid and valve arrangement 903, 904, 905, 906 can be replaced by a direct acting solenoid valve or actuator 950 that is controlled by the device's processor 902.

The same arrangement depicted in FIG. 9 can be used to determine or approximate the amount of $CO_2$ as remaining in a $CO_2$ supply cylinder. This is done by utilising the pressure transducer 912 and microprocessor 902 to measure both the pressure rise in the bottle 909 and the time over which the pressure increase occurs. When the rate of pressure increase is higher, the gas cylinder 900 is known to be fuller than when the pressure rise time is smaller. The microprocessor can also compare rise times between any two carbonation cycles and use the differences in detected pressure and time to provide information about the fill level of the cylinder 900. Accurate assessment of the fill level of the cylinder prevents inadvertent waste resulting from premature replacement of a cylinder with a new cylinder.

The sensor 912b may also cooperate with the device's processor 902 to determine when the liquid level in a bottle being filled has reached an acceptable level or volume. To perform this method, a filled bottle is engaged with the fill head and the solenoid or mechanism that activates the carbon dioxide has cylinder is activated for a pre-determined time interval 1901 as show in FIG. 19. After the interval 1901, the gas flow is stopped 1902 and the sensor and processor perform a pressure determination, this being the pressure of the gaseous head above the liquid. For this method it is required that the pressure sensor 912b be located above the liquid level when the bottle is coupled to the fill head. Once the interior of the bottle is isolated from the source of pressurized CO2, a pressure reading is taken. If the determined pressure is above a pre-determined threshold level 1903 the liquid level in the bottle is deemed excessive. If the pressure reading is below a second threshold 1904 the liquid level in the bottle is deemed to be inadequate. Where the determined liquid level is excessive or inadequate, the user is provided with a visible or audible warning on the device's interface 803. If the determined pressure is between the first and the second threshold then the fluid level is deemed to be adequate and the processor allows the fill process to continue. The activation interval of the solenoid 1901 and the thresholds 1903, 1904 depend on the mechanism used and the size and configuration of the bottle being filled.

The solubility of carbon dioxide gas usually decreases as the temperature of the liquid increases. Thus, liquid that is cold or may have been refrigerated will generally hold a greater amount of carbon dioxide gas than a similar volume of water at room temperature. As suggested by FIG. 8, a user input, preferably in the form of a toggle-like control such as a button or switch can be used to provide information to the processor 902 regarding water temperature. By operating the switch or toggle 805, a user can provide information to the processor as to whether or not the beverage to be carbonated is chilled. When the user indicator, as determined by the processor, relates to a chilled beverage or a liquid, the processor can adjust the carbonation time, via the signal to the pull solenoid 906 to effectively compensate for the approximate beverage temperature. In the alternative, the processor can cause an increase in the pressure of the has stream to the bottle 909 or the duration of the discharge, or both of these in order to achieve a consistent level of carbonation between chilled and unchilled liquids.

In the alternative, and with reference to FIG. 9, a sensor 912 associated with the fill head can directly determine the temperature of the liquid in the bottle 909 and this temperature information can be provided to the processor 902. The processor will act in accordance with the measured temperature so that consistent carbonation is achieved regardless of the actual beverage temperature.

With respect to the graph of pressure versus time at the bottom of FIG. 10, it will be appreciated that the level of carbonation in the liquid being carbonated can be related to the integral or area under the pressure curve during CO2 discharge. Because the carbonation process proceeds in multiple discrete increments rather than continuously, the total carbonation is the sum of the integrals during carbonation periods. For example, and with reference to FIG. 10 the area under the pressure curve starting from the initial time at which carbonation is first initiated 1020 to the time at which the fill solenoid is first turned off 1021 indicates the extent of carbonation up until the second of these points in time 1021. Further carbonation is added at a point in time 1022 when the fill solenoid is next activated and stops at a point in time when the fill solenoid is next deactivated 1023. Accordingly, the total delivered carbonation would be the sum of the areas under the pressure curve between the first time interval (1020 to 1021) plus the area under the curve for the second interval (1022 to 1023). The processor can be caused to increase the carbonation level, for example, by increasing the range between the upper cut-off pressure limit 1024 and the pressure cut-off lower limit 1025. A second way of increasing the carbonation is to increase the length of the time intervals 1026, 1027 that the fill solenoid is activated. Thus for the carbonation of chilled water and upper pressure limit of 80 psi and a lower pressure limit of 40 psi may be adequate Whereas for room temperature water, an upper limit for pressure may be 100 psi and a lower limit be 60 psi. In this way, carbonation cycles for chilled and room temperature liquids may utilise the same solenoid timing intervals depicted in FIG. 10. In the alternative, both chilled and room temperature liquids can be carbonated between an upper limit of 80 psi and a lower limit of 40 psi while changing, particularly lengthening, the "on" duration of the fill solenoid 1026, 1027 etc.

Figure 11:
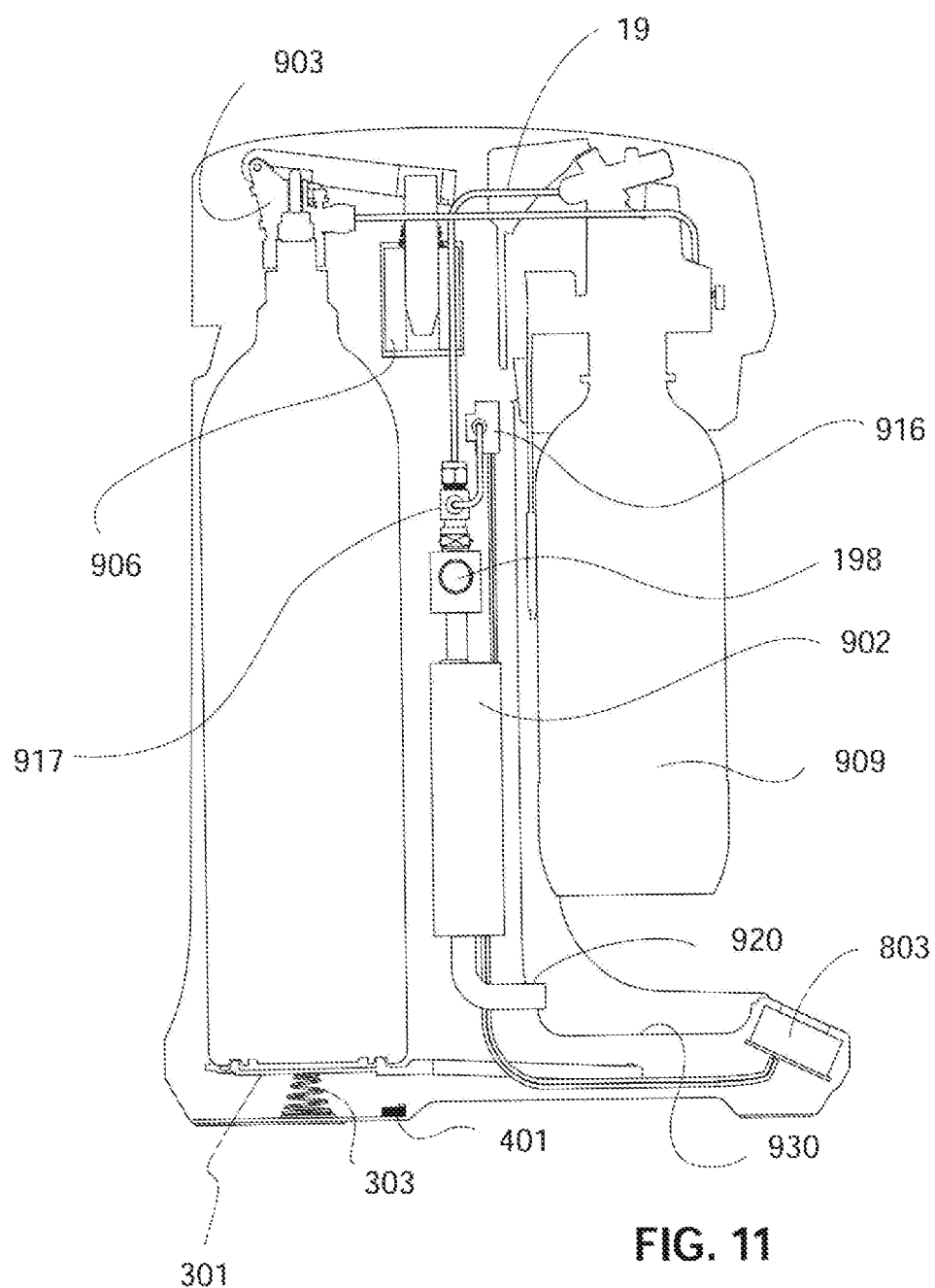
FIG. 11 is a cross sectional view of a carbonator.

The apparatus suggested by FIGS. 9 and 11 may also be employed to provide a self-cleaning mode. In a self-cleaning mode, the vent solenoid 198 is opened while a carbonation operation is conducted on a bottle 909 having clean water in it. This action will cause clean water to enter the gas discharge line 19, the water eventually exiting the discharge vent 920, preferably into a drip tray 930 located under or accessible from under the bottle being carbonated (see FIG. 2).

Figure 12:
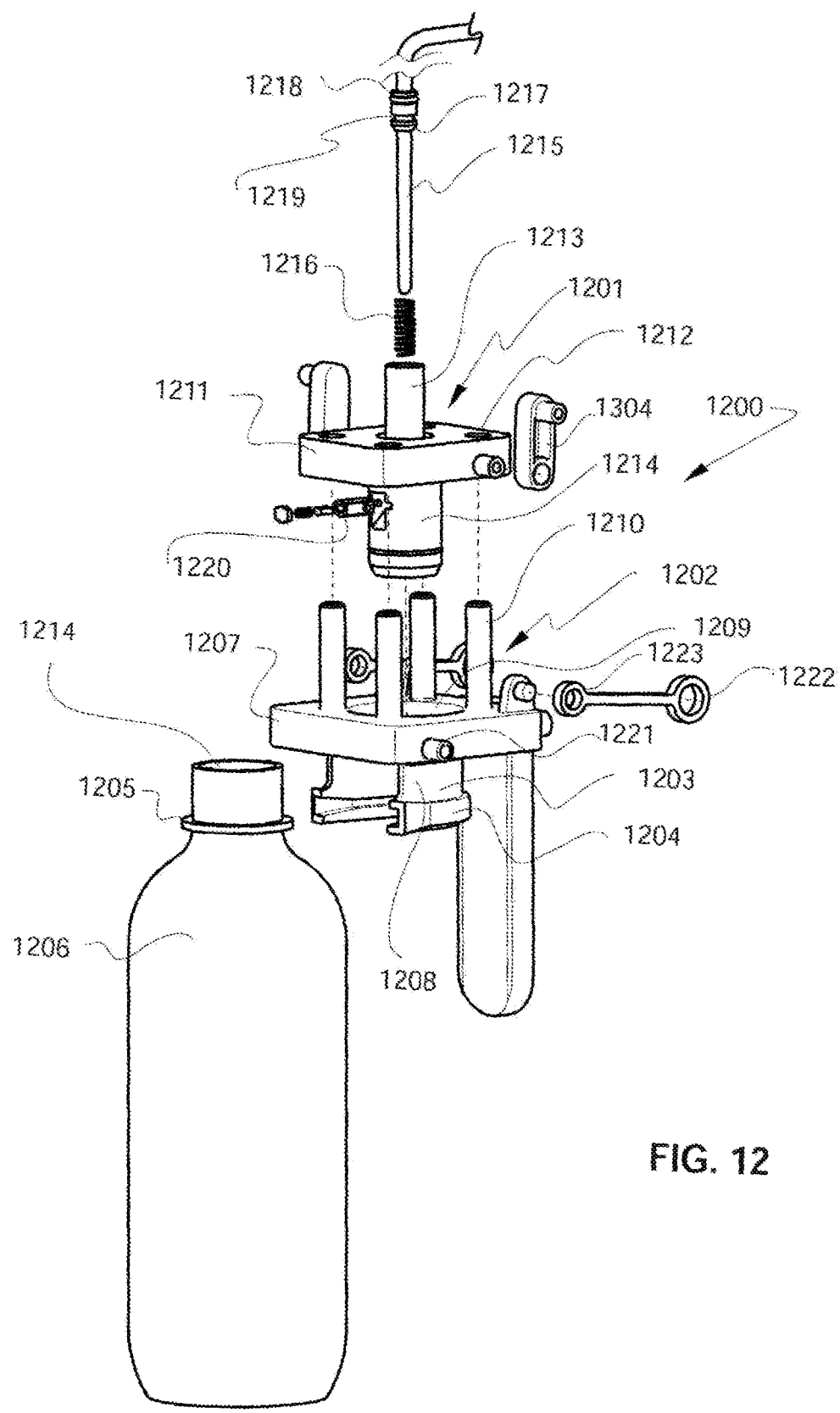
FIG. 12 is an exploded perspective of a fill head and bottle to be carbonated.

As shown in FIG. 12, an alternate style fill head 1200 comprises an upper part 1201 that reciprocates relative to a lower part 1202. The lower part of the fill bead 1202 has a collar with an open side 1203 that incorporates a "U" shaped groove 1204 that is adapted to receive a circumferential flange 1205 located in the neck area of a bottle 1206 that is suitable for carbonation. The groove 1204 is spaced away from the main platform 1207 of the lower part by, for example, a "U" shaped channel 1208.

The main platform 1207 has a central opening 1209 supported by a number of upright guide puts 1210. In this example, there are four guide posts 2010 located on an upper surface of the main body 1207 and perpendicular to it. The upper part 1201 of the fill head comprises a reciprocating platform 1211 in which is formed a number of through holes 1212. The through holes 1212 are equal in number to the number of posts 1210 and arranged to slidably receive each of the guide posts 1210. The reciprocating platform 1211 has a guide cylinder 1213 located above the upper surface of the platform 1211 and a sealing plug 1214 having an internal bore that is co-extensive with the internal bore of the guide cylinder 1213. As the reciprocating platform 1211 moves toward the main body 1217, the plug 1214 passes through the central opening 1209 of the lower platform 1207 and is able to enter into and seal against the inside of the spout or neck area 1214 of the bottle 1206. The bore through the guide cylinder 1213 and plug 1214 receives a reciprocating carbonation needle or injector 1215. The carbonation needle is biased into an upper position by a compression spring 1216. The upper part of the compression spring 1216 bears against the lower edge 1217 of an enlarged portion 1218 carried by the carbonation needle 1215. The enlarged portion 1218 also has a circumferential groove 1219. As the carbonation needle 1215 is lowered into the bottle 1206, the groove 1219 is captured by a latch assembly 1220. As will be explained, the motion of the reciprocating platform 1211 is governed by the insertion of the bottle 1206 into the collar of the fill head by a user.

Figure 13:
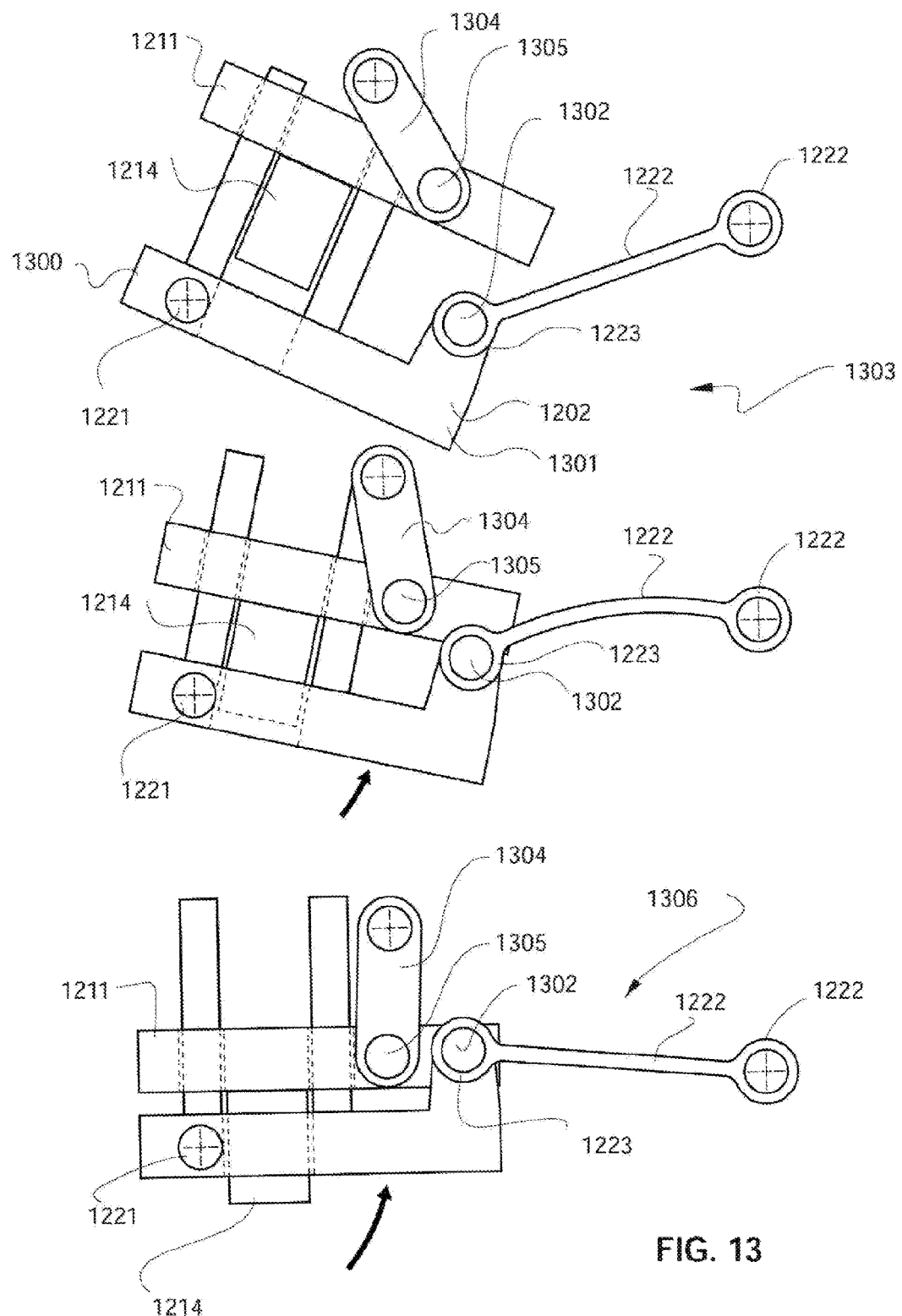
FIG. 13 are cite elevations illustrating the operation of the fill head shown in FIG. 12.

As suggested by FIGS. 12 and 13, a forward portion 1300 of the lower platform 1202 is pivotally attached to the chassis or frame of the carbonator. In the example, the lower platform is provided with a stub shaft or post 1221 on either side. Thus, the lower platform pivots around the post 1221, the pivoting motion of the lower platform is moderated by a pair of flexible beams 1222. In this example, each beam has a circular collar at each end. One collar 1223 attaches to the rear portion of the lower platform 1301 by means of a stub 1302 located above the upper surface of the lower platform 1207. As suggested by FIG. 13, rotation of the lower platform from its initial or inclined platform position 1303 causes the beams 1222 to bend and causes the reciprocating platform 1211 to move toward the lower platform. The motion of the reciprocating platform 1211 is governed by a pair of links 1304. The links 1304 are attached to pivot stubs 1305 carried on the lateral edges of the reciprocating platform, toward the rear of the platform, that is, behind the centre line of the plug 1214. When the fill head reaches a fully engaged orientation 1306 the beams 1222 are able to extend fully and contribute to the rotation of the fill head into position in accordance with the effort they exert on the stubs 1302. In the fully engaged orientation 1306 the reciprocating platform's links 1304 are essentially vertical and thus resist upward vertical forces on the plug 1214. After being fully engaged, the bottle becomes disengaged from the fill head only by tilting the bottle toward the initial or insertion position. This causes a reversal of the motions shown in FIG. 13 and returns the fill head to the initial orientation in which the plug 1214 is withdrawn from the bottle 1206. Once the plug 1214 is retracted from the bottle 1206, the bottle can be removed from the collar 1203.

Figure 14:
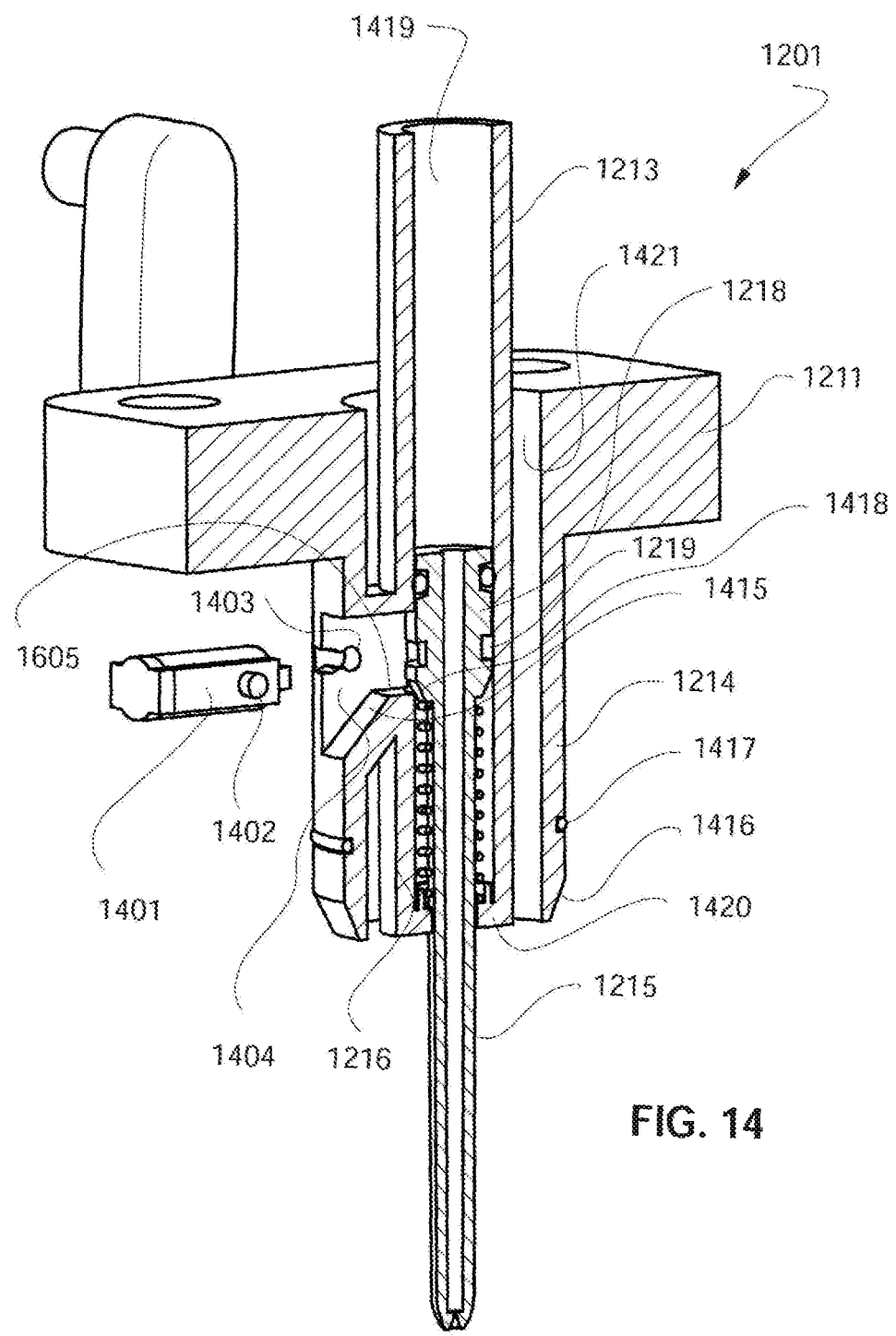
FIG. 14 is a cross section of the fill head shown in FIG. 12.

As shown in FIG. 14, the upper and reciprocating part of the fill head 1201 incorporates a pivoting spring loaded latch assembly 1401. The pivoting latch assembly 1401 rotates about a pair or pivots or stubs 1402 located opposite one another on an exterior of the assembly 1401. The stubs engage with and pivot about openings 1403 formed into the side walls of a recess 1404 formed through a side wall of the plug 1214. The recess has a lower slanted floor 1415 that limits the rotation of the pivoting latch assembly 1401. FIG. 14 also illustrates that the lower end of the plug is tapered 1416 to facilitate its insertion into the mouth of the bottle 1206. A circumferential elastomeric seal 1417 is located in a groove above the taper 1416. Pressurised carbon dioxide introduced into the guide cylinder 1213 drives the CO2 needle 1215 down and into a fill orientation. In this orientation, the enlarged portion's circumferential groove 1219 captures the latch assembly 1401. The enlarged portion 1218 has a circumferential seal in a groove located above the capture groove 1219 and a tapered lower end 1418 that both helps the enlarged portion initially clear the latch, also limiting the downward travel of the enlarged portion when it bears against a narrowed portion of the central bore 1419. In this example, the narrowing of the central bore 1419 occurs in the area of the recess 1404. In this example, the compression spring 1260 is captured between the floor 1420 of the plug and the lower part of the enlarged portion 1218. A second or auxiliary bore 1421 extends through the reciprocating platform 1211 and the plug 1214 are thus providing a second through bore for communicating with an interior of the bottle.

Figure 15:
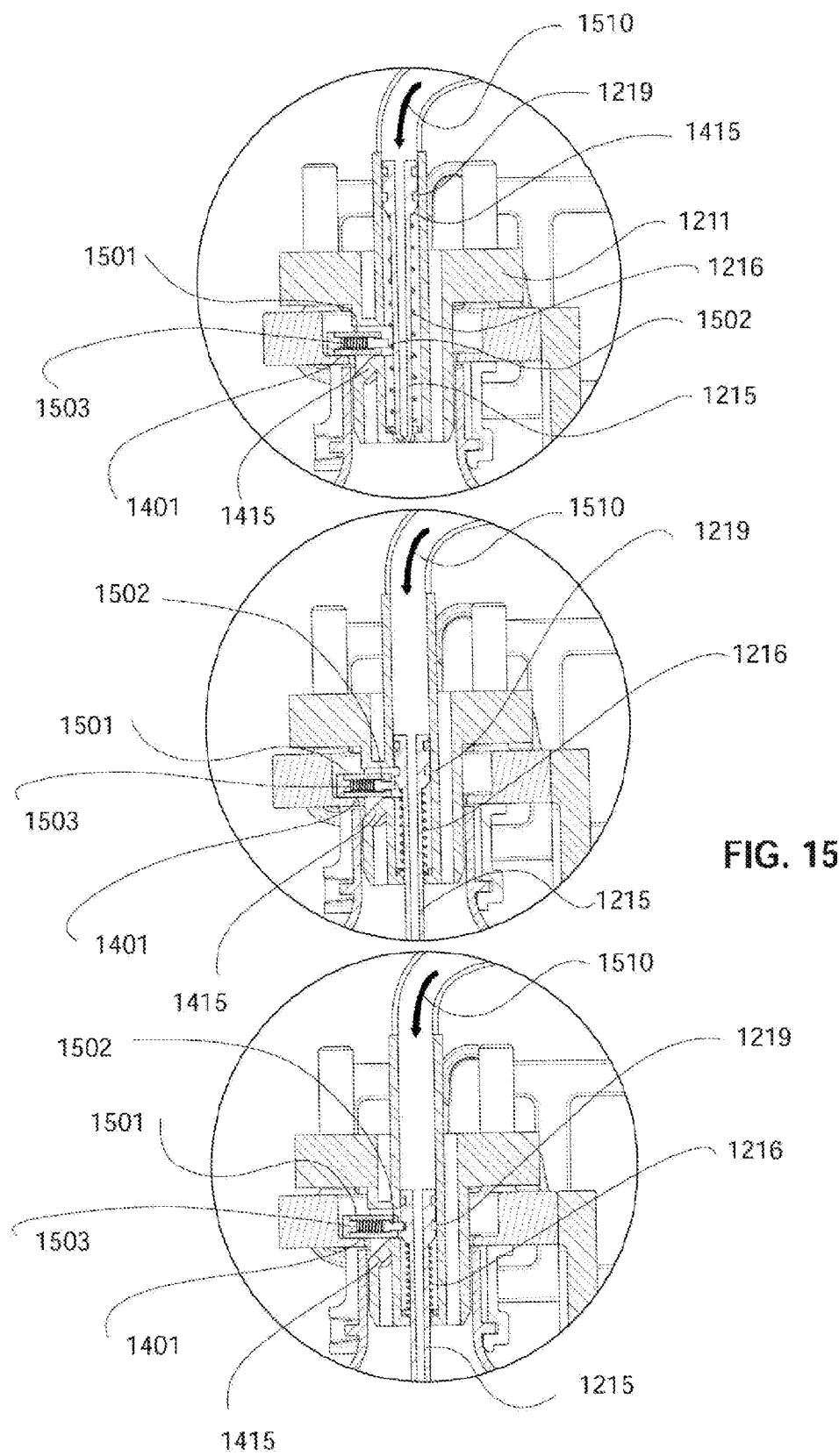
FIG. 15 illustrates common cross sectional view, the operation of the fill head shown in FIG. 12.
Figure 16:
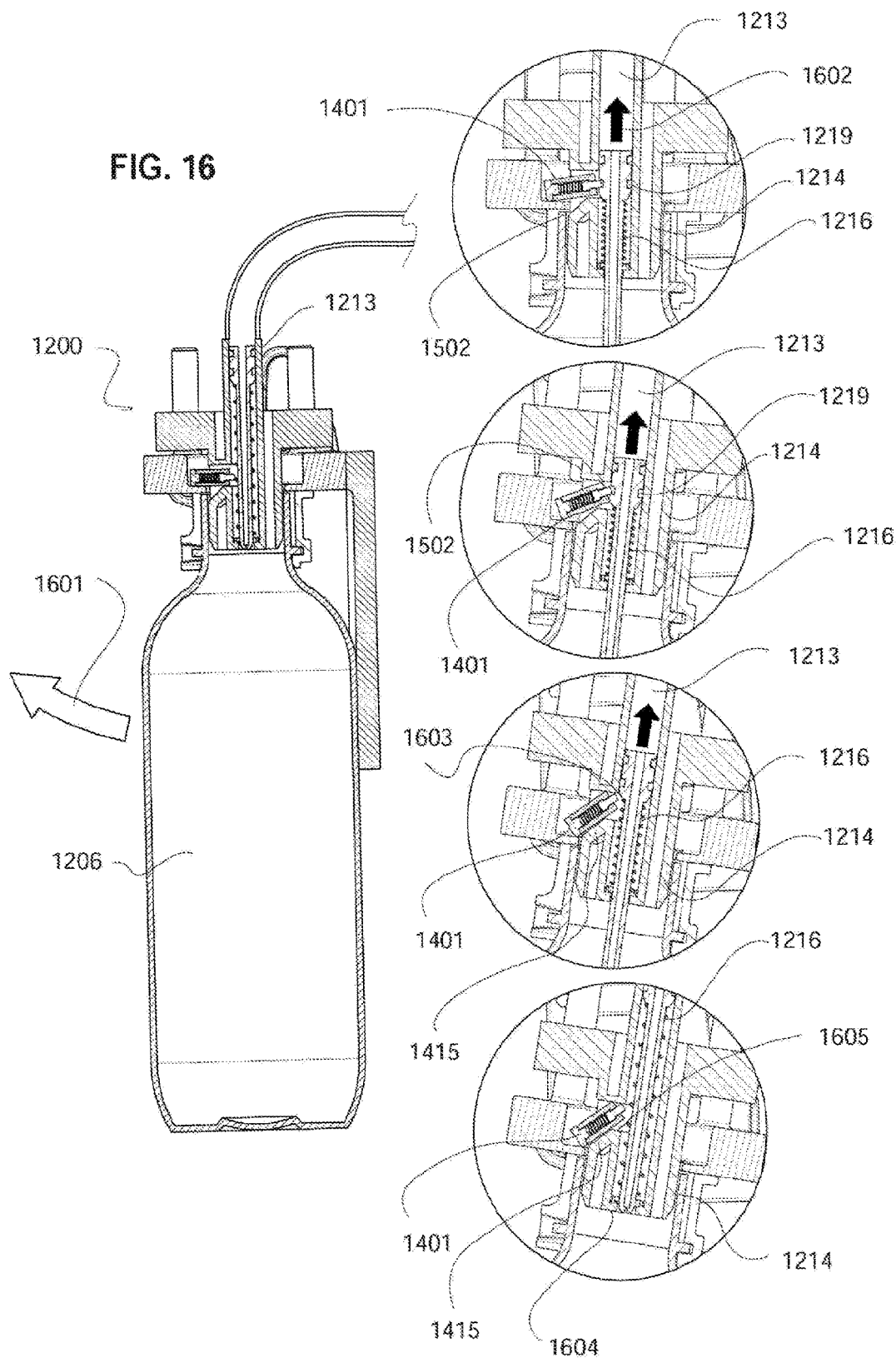
FIG. 16 illustrates common cross sectional view, the operation of the fill head shown in FIG. 12.

As suggested in FIGS. 14 and 15, the pivoting latch assembly 1401 comprises a pivoting body 1501 within which is contained a reciprocating pin 1502 that is urged toward the CO2 injector pin 1215 by a compression spring 1503. As the pin 1215 descends under the influence of pressurised CO2 1510, the tapered portion 1415 urges the pin 1502 to retract, then engage the groove 1219, with the reciprocating latch in a generally horizontal orientation. As shown in FIG. 16, the tilting action 1601 that initiates the withdrawal of the bottle 1206 and the pivoting of the fill head 1200 is also associated with a depressurisation of the CO2 in the guide cylinder 1213. Depressurising the guide cylinder 1213 allows the compression spring 1216 to bear on the enlarged portion 1218 and drive it upward and away from the bottle 1602. The action of the groove 1219 on the reciprocating pin 1502 causes the pivoting latch assembly 1401 to rotate about its pivot points and thus clear the groove 1219, 1603. Unrestrained by the pivoting latch mechanism 1401, the compression spring 1216 drives the needle 1215 until it is fully contained within the plug, 1604. As suggested by FIGS. 14 and 16, the movement of the pivoting latch assembly 1401 is limited by those parts of the plug that are below it, namely the inclined floor 1415 and a horizontal shoulder 1605 located above and radially inward of the inclined floor 1415.

Figure 17:
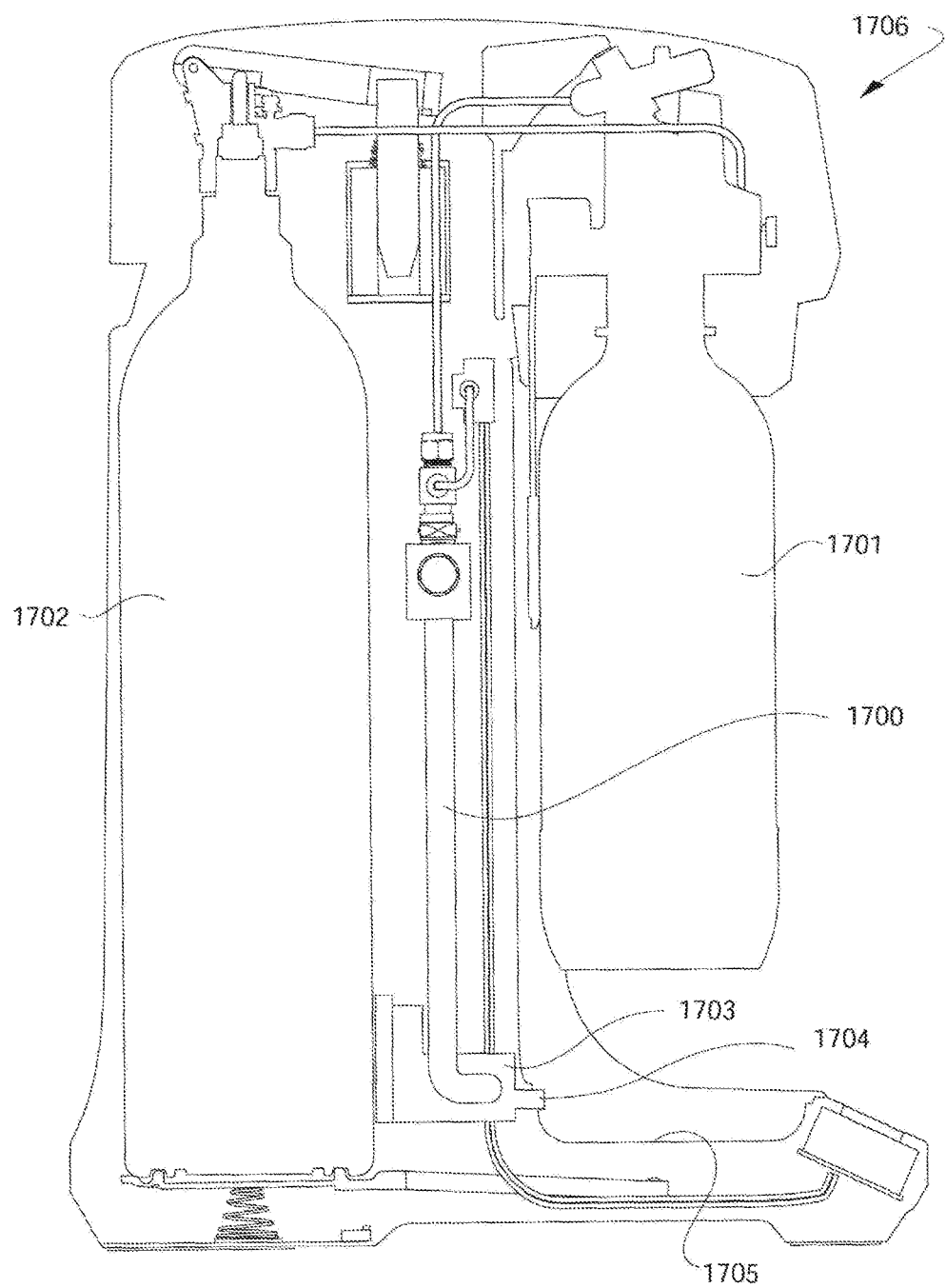
FIG. 17 is a cross sectional view of a domestic carbonator.

As shown in FIG. 17, gaseous exhaust expelled from the CO2 fill system are carried downward by a vertical exhaust tube 1700 located between the bottle being filled 1701 and the CO2 bottle 1702. The exhaust tube 1700 leads to a baffle apparatus 1703. The baffle apparatus 1703 muffles the sounds otherwise made by exhaust gasses and prevents the pressure of the exhaust gasses and liquids from discharging at high velocities. In this example, the baffle apparatus 1703 has an exhaust port 1704 that discharges into the drip tray 1705 of the carbonator 1706.

Figure 18:
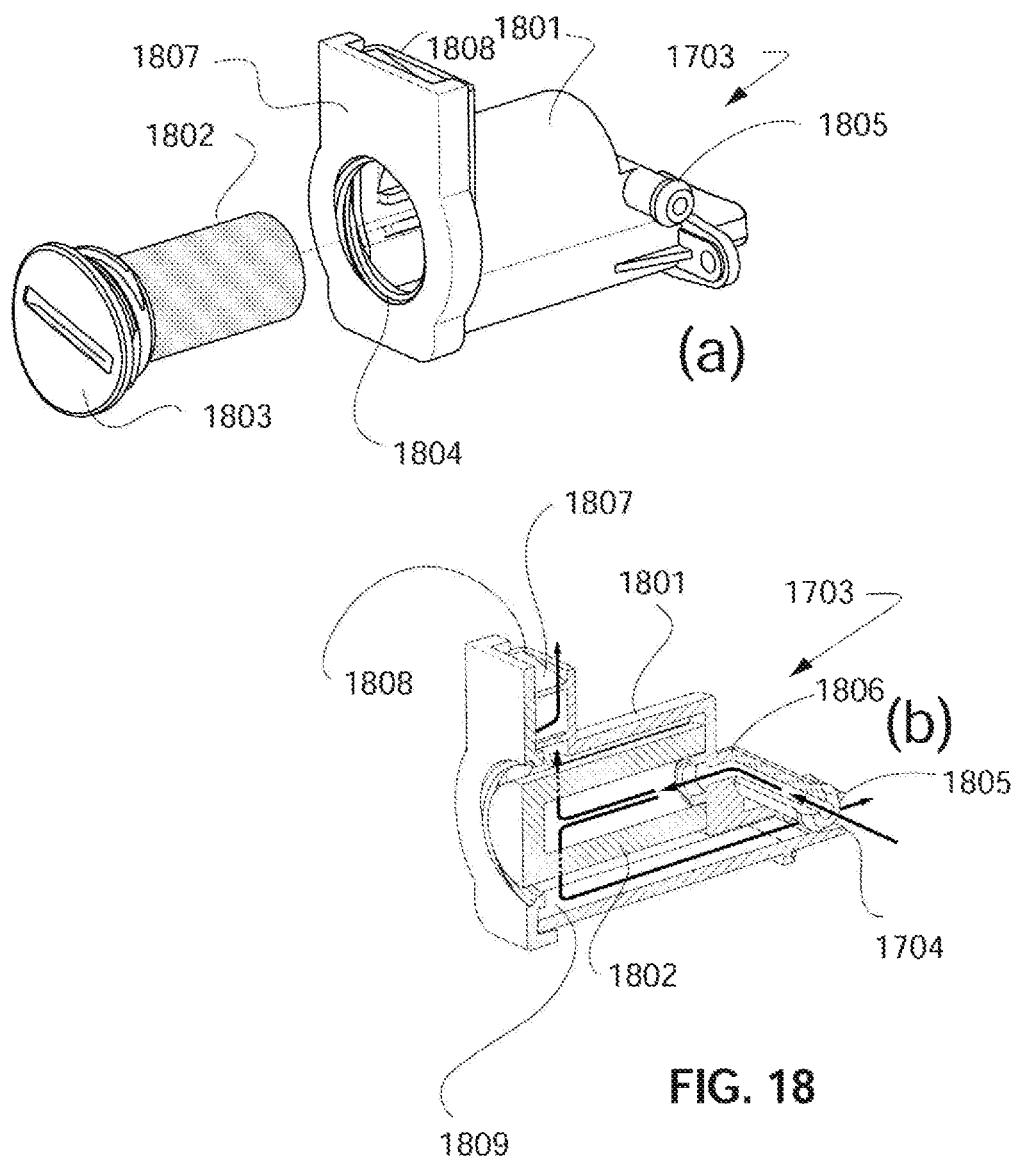

As shown in FIG. 18, the baffle apparatus 1703 comprises an outer housing 1801 that removably receives as perforated or porous silencer 1802. In this example, the silencer is carried by a threaded cap 1803 that engages and seals against a co-operating threaded opening 1804 that passes through the housing 1801. Gasses and liquids entering the baffle apparatus from the exhaust tube 1700 pass through a horizontally oriented entry port 1805. A bend in the port 1806 redirects the flow of gas and liquid to the interior chamber of the generally cylindrical or hollow baffle 1802. Gasses are collected within the housing and are vented upward through a tortuous channel 1807 having a gas vent opening 1808 at its upper extremity. Liquids fall through or are propelled through the baffle and accumulate above the interior floor 1809. The liquid discharge opening 1704 collects and discharges the accumulated liquid into, for example, the drip tray 1705. The baffle 1802 can be removed by unscrewing the cap 1803, for cleaning replacement or maintenance.

The flow chart of FIG. 20 illustrates a typical operational cycle of a beverage carbonator made in accordance with the teachings of the present invention. The process begins with the powering up of the device. Checking for the presence of the bottle to be carbonated is not required during the power up. Thereafter, a bottle containing liquid to be carbonated is coupled to the fill head 2000. The processor looks for a signal from the presence sensor or switch 401 to determine if the bottle to be filled is present 2001. If this check fails, the user is alerted by a warning or indicator on the user interface, for example, by an or using the display 803. This will cause the user to reinsert or reattach the bottle 2002. If the processor confirms the presence of the bottle the user can input a carbonation level using the control 807 and initiate a carbonation cycle using the start/cancel button 804. This initiates a carbonation cycle 2003. Thereafter, the processor determines the temperature of the liquid in the bottle 2004 or receives a signal from the user's toggle switch 805. This causes the exhaust solenoid, otherwise open, to close 2005. The actuator valve or solenoid is then opened or activated for single pulse 2006. The processor uses the resultant pressure level determination from within the bottle to be carbonated as at indication of the actual fluid level in the bottle to be filled 2007. If the water level is determined to be inadequate, the user is provided with an audible or visible warning on the user interface 2008. If the water level is determined to be acceptable, the liquid is carbonated by the addition of pressurized carbon dioxide gas as previously outlined. The carbonation pressure and time are adjusted to suit the indicated water temperature 2009. The delivered gas volume is determined by the processor 2010. If the determined volume of gas actually delivered is lower than the volume required the user receives an error message from the interface 2011. The delivered gas volume is detected by the processor 2012. When the delivered gas volume is adequate the delivery of pressurized CO2 is stopped by the processor 2013. The processor continuously cheek for the presence of the bottle from the time that the liquid temperature is determined 2004 until the CO2 supply is turned off 2013. If the bottle is not detected, at any point during that portion of the process, the supply of CO2 is ceased by activating the pull solenoid and the exhaust valve is opened to the atmosphere. A warning will be provided to the user with the interface. The user will then reinsert or reseat the bottle to be carbonated and start the process again by selecting a carbonation level and activating the start switch 2003. If, for example, the processor determines that the bottle is not correctly positioned or is not in position at all, the processor will cause the exhaust valve or exhaust solenoid previously closed in step 205 to open and vent the pressure in the head space above the liquid in the bottle. IL may remain open for example, for 2 seconds in order to vent the head space. Thereafter, the exhaust valve will close for an interval of for example, 30 seconds 2014 to prevent unnecessary discharge of dissolved gas from the liquid being carbonated. The user will be unable to remove the bottle or will be advised against removing the bottle whenever there is excessive pressure in the head space. If the process has proceeded without error, the beverage is ready 2015.

Even after the beverage is nominally ready for consumption, the user may use an activator or controller on the interface to request an additional but small amount of further carbonation 806, 2016. This causes the exhaust solenoid to close to the environment 2017 and the pull solenoid to be activated for a brief interval, say 1 second 2018. Thereafter, the carbonation cycle is terminated 2013. The additional carbonation sequence 2016 can also be accessed from the activator 806 outside of or in parallel with the processors that determine the primary carbonation sequence 2019 so long as the processor has determined that the bottle to be carbonated is correctly retained by the device 2001.

As shown in FIG. 21, a cap 2100 capable of sealing a carbonated beverage bottle 201 comprises a body 2101 within which is located a source of power such as a battery and processor 2101 adapted to receive signals from, for example, a pressure sensor 2103 or a temperature sensor 2104 (or both of these) located on an underside 2105 of the cap 2100. The underside 2105 is isolated from the environment by internal site walls 2106 of the cap which may be threaded 2107 or otherwise adapted to make a sealing engagement with a bottle. An upper surface 2108 or an external side wall 2109 of the cap may be provided with a graphic display 2110, 2111. The display would provide a user with information about the temperature and pressure as sensed by the sensors 2103, 2104.

Although the invention has been described with reference to specific examples, it will be appreciated by those skilled in the art that the mention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in an other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in as single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout they specification discussions utilizing terms such as "processing," "computing," "calculating," "determining" or the like, refer to the action and/or processes of as microprocessor, controller computer or computing system, or similar electronic computing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided b way of example and not as limitations to the scope at spirit of the invention.

What is claimed is:

1. A carbonation device having a microprocessor, the device adapted to carbonate contents of a bottle containing a liquid, the bottle having a maximum fill level, comprising:
   a delivery valve adapted to be attached to a carbon dioxide cylinder, the delivery valve having a valve actuator;
   the delivery valve supplying carbon dioxide from the cylinder to a fill head, the fill head being connected to a fill line from the delivery valve and to a vent that is controlled by an exhaust solenoid valve;
   the fill head having a pressure sensor that provides a pressure signal to the microprocessor, the pressure sensor located above the maximum fill level of the bottle when the bottle is in a sealed engagement with the fill head; and
   wherein the microprocessor is adapted to operate the valve actuator in multiple discrete increments, each increment resulting in an increase in pressure over a period of time, as measured by the pressure sensor and the microprocessor; and
   wherein the microprocessor is further adapted to cooperate with the pressure sensor to determine a first rate of a pressure increase during a first increment, a second rate of pressure increase during a second increment, and perform a comparison of the first rate to the second rate and, based on a rate decrease, to determine an amount of carbon dioxide remaining in the cylinder.

2. The device of claim 1, wherein:
   the exhaust solenoid valve remains closed as carbon dioxide is being supplied to the fill head until an upper pressure limit is reached, the upper pressure limit being measured by the microprocessor using the pressure sensor.

3. The device of claim 2, wherein:
   each increment having predetermined upper and lower pressure limits and thus defining a pressure curve over time;
   the microprocessor summing an integral of the pressure curve to determine a total delivered pressurization.

4. The device of claim 3, wherein:
   the lower pressure limit for an increment is equal to or greater than 40 psi.

5. The device of claim 3, wherein:
   an increment is followed by a predetermined rest interval.

6. The device of claim 3, wherein:
   the exhaust solenoid valve is activated between increments.

7. The device of claim 1, wherein:
   the controller receives a temperature input signal that relates to a temperature of the contents;
   the controller increasing a delivery volume of carbon dioxide when the temperature of the contents is below a room temperature.

8. The device of claim 1, wherein:
   the reduction in the carbon dioxide volume in the cylinder is displayed on a user interface of the device.

9. The device of claim 1, wherein:
   the exhaust solenoid valve remains closed as carbon dioxide is being supplied to the fill head until an upper pressure limit is reached, the upper pressure limit being measured by the controller using the pressure sensor;
   each increment having predetermined upper and lower pressure limits thus defining a pressure curve over time;
   the microprocessor arranged to sum an integral of the pressure curve to determine a total delivered carbonation;
   the exhaust solenoid valve being activated between increments; and wherein the vent is operated by the microprocessor to close when the lower pressure limit is reached.

10. A carbonation device, comprising:
a microprocessor, the device adapted to carbonate the contents of a bottle containing a liquid, the bottle having a maximum fill level, the device further comprising:
a carbonation delivery valve adapted to be attached to a carbon dioxide cylinder, the delivery valve having a valve actuator;
the delivery valve supplying carbon dioxide to a fill head, the fill head being connected to a fill line from the delivery valve and to a vent that is controlled by an exhaust solenoid valve;
the fill head having a pressure sensor that provides a pressure signal to the microprocessor, the pressure sensor located above the maximum fill level of the bottle when the bottle is in a sealed engagement with the fill head;
wherein the exhaust solenoid valve remains closed as carbon dioxide is being supplied to the fill head until an upper pressure limit is reached, the upper pressure limit being measured by the controller using the pressure sensor;
the valve actuator operated by the microprocessor in multiple discrete increments;
wherein the microprocessor is further adapted to cooperate with the pressure sensor to determine a first rate of a pressure increase during a first increment, a second rate of pressure increase during a second increment, and perform a comparison of the first rate to the second rate and, based on a rate decrease, to determine an amount of carbon dioxide remaining in the cylinder; and
each increment having predetermined upper and lower pressure limits and thus defining a pressure curve over time;
the microprocessor summing an integral of the pressure curve to determine a total delivered carbonation;
the exhaust solenoid valve being activated between increments; and
wherein the vent is operated by the microprocessor to close when the lower pressure limit is reached.

11. The device of claim 10, wherein:
a rest interval comes after the vent is closed.

* * * * *